(12) United States Patent
Xu et al.

(10) Patent No.: US 9,510,212 B2
(45) Date of Patent: Nov. 29, 2016

(54) SIGNAL DESIGNS FOR DENSELY DEPLOYED NETWORK

(71) Applicant: QUALCOMM Incorporated, San Diego, CA (US)

(72) Inventors: Hao Xu, San Diego, CA (US); Durga Prasad Malladi, San Diego, CA (US); Yongbin Wei, San Diego, CA (US); Peter Gaal, San Diego, CA (US); Wanshi Chen, San Diego, CA (US); Tao Luo, San Diego, CA (US); Aleksandar Damnjanovic, Del Mar, CA (US); Stefan Geirhofer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 13/870,523

(22) Filed: Apr. 25, 2013

(65) Prior Publication Data
US 2013/0286965 A1    Oct. 31, 2013

Related U.S. Application Data

(60) Provisional application No. 61/639,706, filed on Apr. 27, 2012.

(51) Int. Cl.
  *H04W 4/00* (2009.01)
  *H04W 16/26* (2009.01)
  *H04W 48/10* (2009.01)
  (Continued)

(52) U.S. Cl.
  CPC .......... *H04W 16/26* (2013.01); *H04J 11/0069* (2013.01); *H04L 5/0035* (2013.01); *H04L 5/0048* (2013.01); *H04L 5/0053* (2013.01); *H04L 27/261* (2013.01); *H04L 27/2692* (2013.01); *H04W 48/10* (2013.01);
  (Continued)

(58) Field of Classification Search
  CPC ....................................................... H04W 16/32
  See application file for complete search history.

(56) References Cited

U.S. PATENT DOCUMENTS 6,665,277 B1    12/2003 Sriram
6,894,995 B2    5/2005 Chitrapu et al.
(Continued)

FOREIGN PATENT DOCUMENTS

EP        2276275 A1    1/2011
WO    2013015645 A2    1/2013

OTHER PUBLICATIONS

3GPP: "3rd Generation Partnership Project Technical Specification Group Radio Access Network; Evolved Universal Radio Access Network; Evolved Universal Terrestrial Radio Access (E-Ultra); radio Resource Control (RRC); Protocol Specification (release 10)", 3GPP dtraft 36331-A50 Update with rev marks , 3rd Generation Partnership Project (3GPP), Mobile Competence centre; 650, Route Des Lucioles; F-06921 Sophia-Antipolis Cedex; Mar. 12, 2012, XP050664081, Retrived from the Internet: URL: http://www.3gpp.org/ftp/tsg_ran/WG2_RL2/Specifications/201203_draft_specs_after_RAN_55/[Retrieved on Mar. 12, 2012] Paragraph 5.6.3.
(Continued)

*Primary Examiner* — Kevin C Harper
(74) *Attorney, Agent, or Firm* — Patterson & Sheridan, LLP (57) ABSTRACT

Aspects of the present disclosure relate to techniques that may be utilized in networks with relatively dense deployments of nodes, such as remote radio heads (RRHs) and UE relays.

33 Claims, 8 Drawing Sheets

(51) Int. Cl.
*H04W 74/00* (2009.01)
*H04L 5/00* (2006.01)
*H04L 27/26* (2006.01)
*H04J 11/00* (2006.01)
*H04W 56/00* (2009.01)
*H04W 88/08* (2009.01)
*H04L 25/03* (2006.01)

(52) U.S. Cl.
CPC ...... *H04W74/002* (2013.01); *H04L 25/03828* (2013.01); *H04W 56/00* (2013.01); *H04W 88/085* (2013.01)

(56) References Cited

U.S. PATENT DOCUMENTS

| | | | |
|---|---|---|---|
| 7,486,656 B2 | 2/2009 | Lin | |
| 7,969,964 B2 | 6/2011 | Kim et al. | |
| 2002/0034950 A1* | 3/2002 | Sawada | H04W 16/32 455/446 |
| 2010/0165882 A1 | 7/2010 | Palanki et al. | |
| 2010/0273484 A1* | 10/2010 | Ishii | H04J 11/0069 455/435.2 |
| 2011/0211537 A1 | 9/2011 | Sivanesan et al. | |
| 2012/0033622 A1 | 2/2012 | Kalhan | |
| 2012/0034924 A1 | 2/2012 | Kalhan | |
| 2012/0039284 A1 | 2/2012 | Barbieri et al. | |
| 2012/0134275 A1 | 5/2012 | Choi et al. | |
| 2012/0213107 A1 | 8/2012 | Jang et al. | |
| 2012/0287875 A1 | 11/2012 | Kim et al. | |
| 2012/0307670 A1* | 12/2012 | Kazmi | H04W 24/10 370/252 |
| 2013/0029657 A1* | 1/2013 | Gao | H04W 74/004 455/422.1 |
| 2013/0039199 A1 | 2/2013 | Liao et al. | |
| 2013/0094384 A1 | 4/2013 | Park et al. | |
| 2013/0273878 A1* | 10/2013 | Heo | H04W 28/02 455/405 |

OTHER PUBLICATIONS

3GPP: "3rd Generation Partnership Project Technical Specification Group Radio Access Network; Evolved Universal Radio Access Network; Evolved Universal Terrestrial Radio Access (E-Ultra); Requirements for Support of Radio resource Management (Release 8)" 3GPP Draft; Draft 36133-8H0, 3rd Generation Partnership Project (3GPP) Mobile Communication Centre; 650, Route Des Lucioles; F-06921 Sophia-Antipolis Cedex; France, Mar. 14, 2012, XP050611675, [Retrived on Mar. 14, 2012] Paragraph A6.2.

International Search Report and Written Opinion—PCT/US2013/038328—ISA/EPO—Nov. 4, 2013.

Fujitsu: "Consideration on Efficient Discovery of Small Cell" 3GPP Draft; R1-131100 Consideration on Efficient Discovery of Small Cell, 3rd Generation Partnership Project (3GPP), Mobile Competence Centre—650 Route Des Lucioles; F-06921 Sophia-Antipolis Cedex, vol. ARAN WG1, No. Chicago, US; Apr. 15, 2013-Apr. 19, 2015 Apr. 5, 2013, XP050696746, Retrieved from the Internet: URL:http://www.3gpp.org/ftp/tsg_ran/WG1_RL1/TSGR1_72b/Docs.

Partial International Search Report—PCT/US2013/038328—ISA/EPO—Sep. 12, 2013.

\* cited by examiner

SIGNAL DESIGNS FOR DENSELY DEPLOYED NETWORK

CROSS-REFERENCE TO RELATED APPLICATIONS

This application claims benefit of priority to U.S. Provisional Application Ser. No. 61/639,706, filed on Apr. 27, 2012, which is expressly incorporated by reference herein in its entirety.

TECHNICAL FIELD

Certain embodiments of the present disclosure generally relate to wireless communication and, more particularly, to techniques for activating opportunistic relays.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Some systems may utilize a relay base station that relays messages between a donor base station and wireless terminals. The relay base station may communicate with the donor base station via a backhaul link and with the terminals via an access link. In other words, the relay base station may receive downlink messages from the donor base station over the backhaul link and relay these messages to the terminals over the access link. Similarly, the relay base station may receive uplink messages from the terminals over the access link and relay these messages to the donor base station over the backhaul link.

SUMMARY

Certain aspects of the present disclosure provide a method for wireless communications by a node belonging to a cluster of cells having a macro node and one or more other type nodes. The method generally includes transmitting a tertiary synchronization signal (TSS) that uniquely identifies the node within the cluster, wherein the cluster is identified by a primary synchronization signal (PSS) and secondary synchronization signal (SSS).

Certain aspects of the present disclosure provide a method for wireless communications by a user equipment (UE) within a cluster of cells having a macro node and one or more other type nodes. The method generally includes detecting a tertiary synchronization signal (TSS), wherein the cluster is identified by a primary synchronization signal (PSS) and secondary synchronization signal (SSS) and identifying a node within the cluster that transmitted the TSS.

Certain aspects of the present disclosure provide a method for wireless communications by a node belonging to a cluster of cells having a macro node and one or more other type nodes. The method generally includes participating in at least a portion of a random access channel (RACH) procedure with a user equipment (UE) and determining, based on capability information obtained during the portion of the RACH procedure, capability of the UE to detect and communicate with other type nodes in the cluster.

Certain aspects of the present disclosure provide a method for wireless communications by a user equipment (UE) within a cluster of cells having a macro node and one or more other type nodes. The method generally includes participating in at least a portion of a random access channel (RACH) procedure with one of the other type nodes in the cluster and conveying, during the portion of the RACH procedure, capability of the UE to detect and communicate with other type nodes in the cluster.

Certain aspects of the present disclosure provide an apparatus for wireless communications by a node belonging to a cluster of cells having a macro node and one or more other type nodes. The apparatus generally includes means for transmitting a tertiary synchronization signal (TSS) that uniquely identifies the node within the cluster, wherein the cluster is identified by a primary synchronization signal (PSS) and secondary synchronization signal (SSS).

Certain aspects of the present disclosure provide an apparatus for wireless communications by a user equipment (UE) within a cluster of cells having a macro node and one or more other type nodes. The apparatus generally includes means for detecting a tertiary synchronization signal (TSS), wherein the cluster is identified by a primary synchronization signal (PSS) and secondary synchronization signal (SSS) and means for identifying a node within the cluster that transmitted the TSS.

Certain aspects of the present disclosure provide an apparatus for wireless communications by a node belonging to a cluster of cells having a macro node and one or more other type nodes. The apparatus generally includes means for participating in at least a portion of a random access channel (RACH) procedure with a user equipment (UE) and means for determining, based on capability information obtained during the portion of the RACH procedure, capability of the UE to detect and communicate with other type nodes in the cluster.

Certain aspects of the present disclosure provide an apparatus for wireless communications by a user equipment (UE) within a cluster of cells having a macro node and one or more other type nodes. The apparatus generally includes means for participating in at least a portion of a random access channel (RACH) procedure with one of the other type nodes in the cluster and means for conveying, during the portion of the RACH procedure, capability of the UE to detect and communicate with other type nodes in the cluster.

Certain aspects of the present disclosure provide an apparatus for wireless communications by a node belonging to a cluster of cells having a macro node and one or more other type nodes. The apparatus generally includes at least one processor configured to transmit a tertiary synchronization signal (TSS) that uniquely identifies the node within the cluster, wherein the cluster is identified by a primary synchronization signal (PSS) and secondary synchronization signal (SSS) and a memory coupled with the at least one processor.

Certain aspects of the present disclosure provide an apparatus for wireless communications by a user equipment (UE) within a cluster of cells having a macro node and one or more other type nodes. The apparatus generally includes at least one processor configured to detect a tertiary synchronization signal (TSS), wherein the cluster is identified by a primary synchronization signal (PSS) and secondary synchronization signal (SSS) and identify a node within the cluster that transmitted the TSS and a memory coupled with the at least one processor.

Certain aspects of the present disclosure provide an apparatus for wireless communications by a node belonging to a cluster of cells having a macro node and one or more other type nodes. The apparatus generally includes at least one processor configured to participate in at least a portion of a random access channel (RACH) procedure with a user equipment (UE) and determine, based on capability information obtained during the portion of the RACH procedure, capability of the UE to detect and communicate with other type nodes in the cluster and a memory coupled with the at least one processor.

Certain aspects of the present disclosure provide an apparatus for wireless communications by a user equipment (UE) within a cluster of cells having a macro node and one or more other type nodes. The apparatus generally includes at least one processor configured to participate in at least a portion of a random access channel (RACH) procedure with one of the other type nodes in the cluster and convey, during the portion of the RACH procedure, capability of the UE to detect and communicate with other type nodes in the cluster and a memory coupled with the at least one processor.

Certain aspects of the present disclosure provide a program product for wireless communications by a node belonging to a cluster of cells having a macro node and one or more other type nodes, comprising a computer readable medium having instructions stored thereon. The instructions are generally for transmitting a tertiary synchronization signal (TSS) that uniquely identifies the node within the cluster, wherein the cluster is identified by a primary synchronization signal (PSS) and secondary synchronization signal (SSS).

Certain aspects of the present disclosure provide a program product for wireless communications by a user equipment (UE) within a cluster of cells having a macro node and one or more other type nodes, comprising a computer readable medium having instructions stored thereon. The instructions are generally for detecting a tertiary synchronization signal (TSS), wherein the cluster is identified by a primary synchronization signal (PSS) and secondary synchronization signal (SSS) and identifying a node within the cluster that transmitted the TSS.

Certain aspects of the present disclosure provide a program product for wireless communications by a node belonging to a cluster of cells having a macro node and one or more other type nodes, comprising a computer readable medium having instructions stored thereon. The instructions are generally for participating in at least a portion of a random access channel (RACH) procedure with a user equipment (UE) and determining, based on capability information obtained during the portion of the RACH procedure, capability of the UE to detect and communicate with other type nodes in the cluster.

Certain aspects of the present disclosure provide a program product for wireless communications by a user equipment (UE) within a cluster of cells having a macro node and one or more other type nodes, comprising a computer readable medium having instructions stored thereon. The instructions are generally for participating in at least a portion of a random access channel (RACH) procedure with one of the other type nodes in the cluster and conveying, during the portion of the RACH procedure, capability of the UE to detect and communicate with other type nodes in the cluster.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
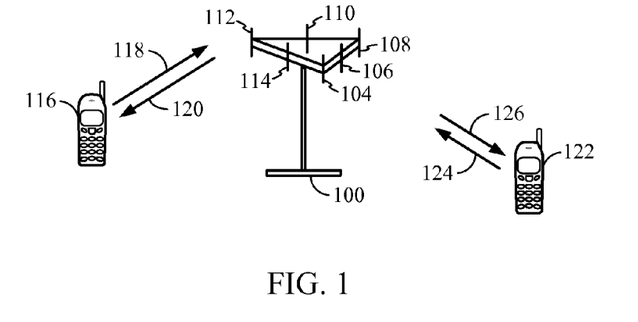
FIG. 1 illustrates a multiple access wireless communication system, according to aspects of the present disclosure.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
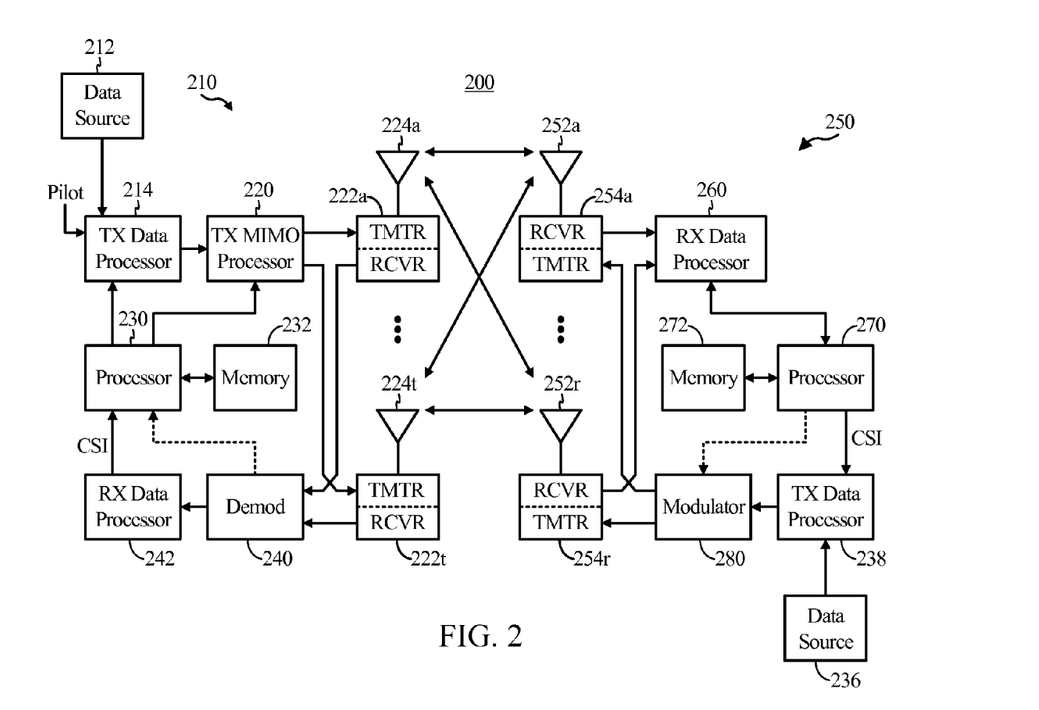
FIG. 2 is a block diagram of a communication system, according to aspects of the present disclosure.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

In an aspect, logical channels are classified into Control Channels and Traffic Channels. Logical Control Channels comprise Broadcast Control Channel (BCCH), which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DL-SCH DownLink Shared CHannel
DM-RS DeModulation-Reference Signal
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multimedia Broadcast Single Frequency Network
MCE MBMS Coordinating Entity
MCH Multicast CHannel
MSCH MBMS Control CHannel
PDCCH Physical Downlink Control CHannel
PDSCH Physical Downlink Shared CHannel
PRB Physical Resource Block
VRB Virtual Resource Block In addition, Rel-8 refers to Release 8 of the LTE standard.

Figure 3:
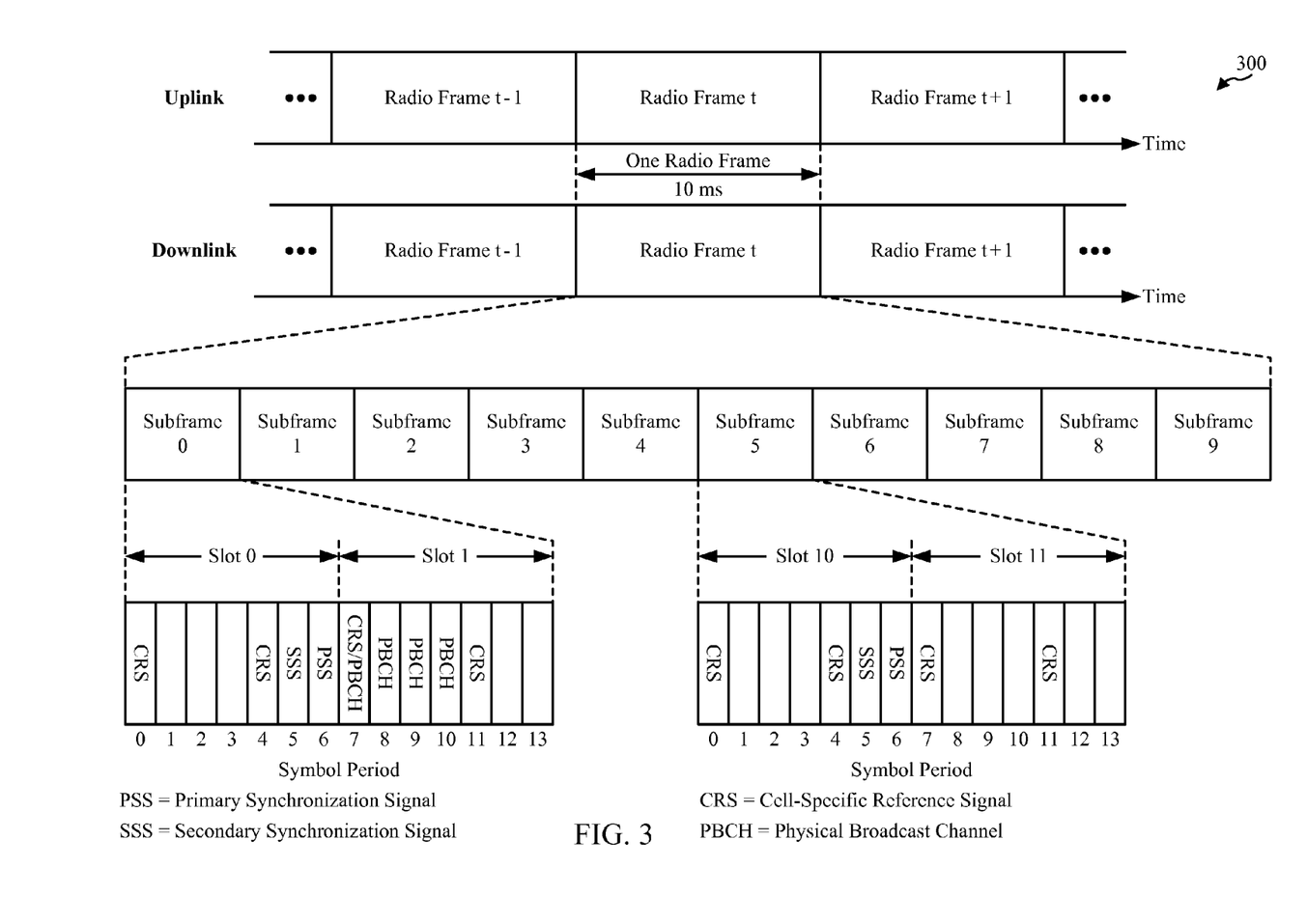
FIG. 3 illustrates an example frame structure, according to aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
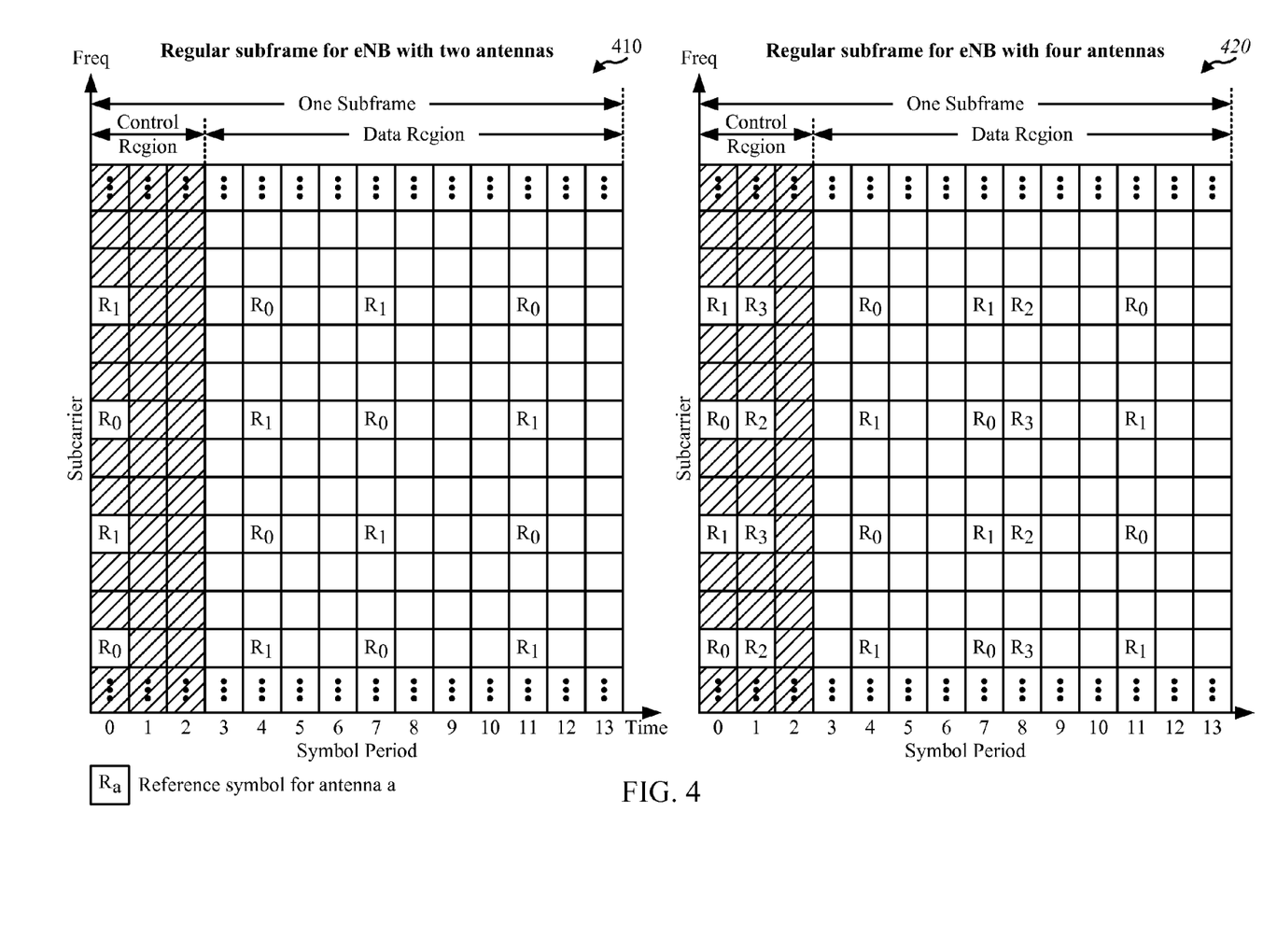
FIG. 4 illustrates an example subframe resource element mapping, according aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈0, . . . , Q−1.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

An Example Relay System

Figure 5:
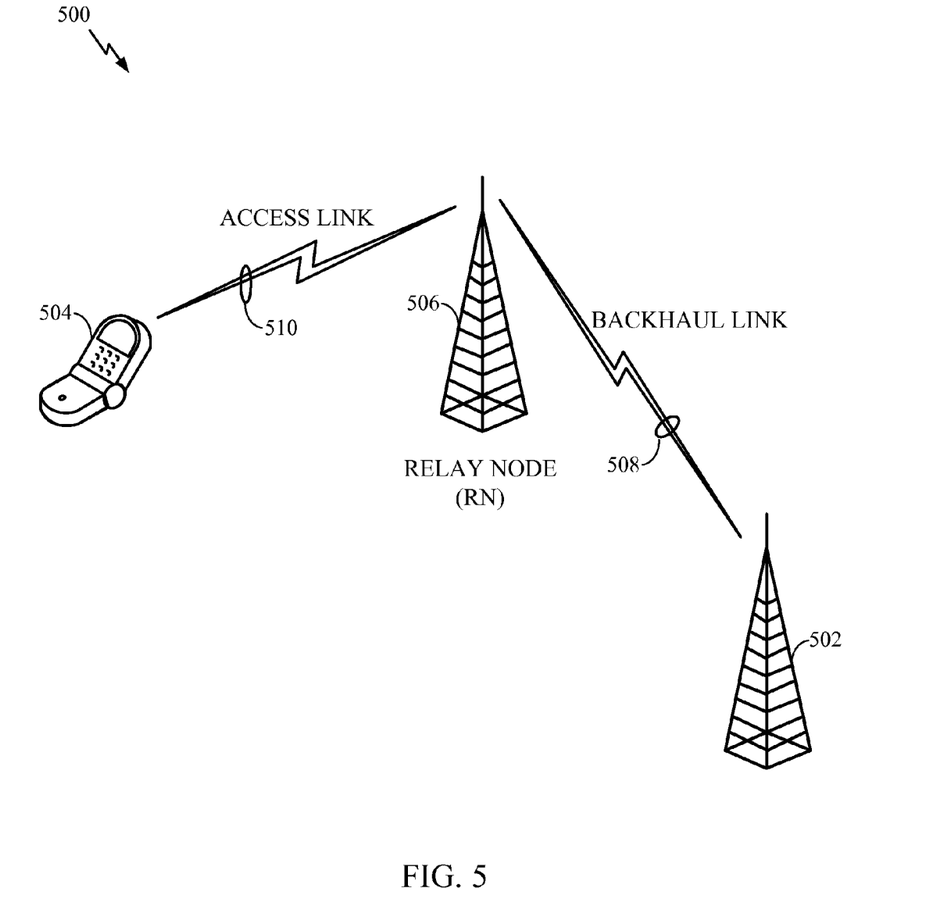
FIG. 5 illustrates an example wireless communication system, according aspects of the present disclosure.

FIG. 5 illustrates an example wireless system 500 in which certain aspects of the present disclosure may be practiced. As illustrated, the wireless system 500 includes a donor base station (BS) 502 that communicates with a user equipment (UE) 504 via a relay node (RN) 506. The RN 506 may communicate with the donor BS 502 via a backhaul link 508 and the relay node 506 may communicate with the UE 504 via an access link 510.

The RN 506 may receive downlink messages from the donor BS 502 over the backhaul link 508 and relay these messages to the UE 504 over the access link 510. RN 506 may, thus, be used to supplement a coverage area and help fill "coverage holes." According to certain aspects, a RN 506 may appear to a UE 504 as a conventional BS. According to other aspects, certain types of UEs may recognize a RN as such, which may enable certain features.

While the RN 506 is illustrated as a relay BS in FIG. 5, those skilled in the art will appreciate that the techniques presented herein may be applied to any type of device acting as a relay node including, for example, a user equipment (UE) acting as a relay between a donor base station and other UEs. As described herein, a UE acting as a relay node may be referred to as a UE relay (UeNB).

Example Signal Designs for Densely Deployed Network

Figure 6:
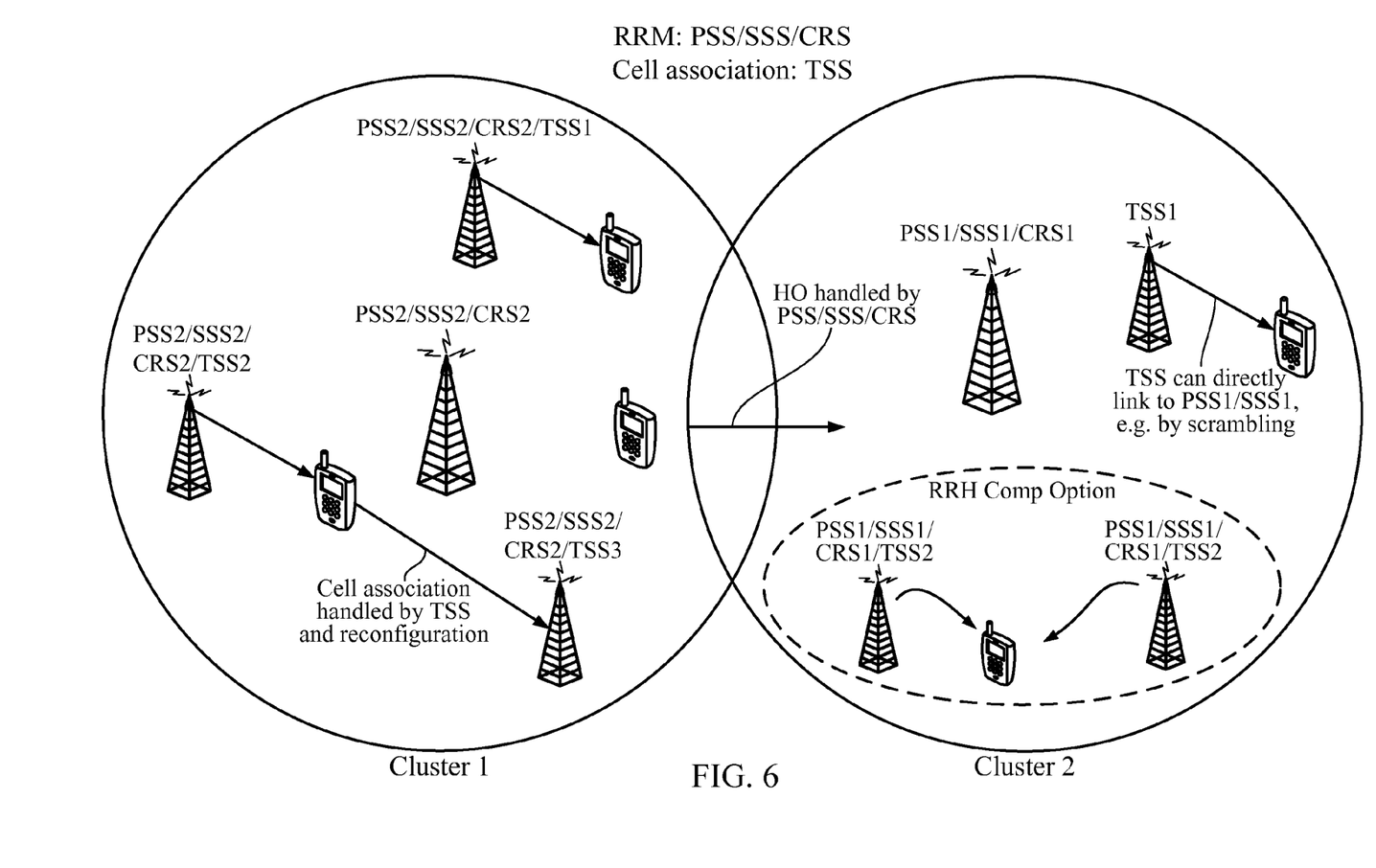
FIG. 6 illustrates an example densely deployed network, in which aspects of the present disclosure may be practiced.

In some cases, to enhance coverage and service, it may be desirable to have a relatively dense deployment of various nodes in addition to a macro base station. As illustrated in FIG. 6. These node may include, for example remote radio heads (RRHs) or relay nodes, which may include UEs acting as relay nodes (which may be referred to as UEnBs). In some cases, UEs acting as relays may be able to go into a dormant state to conserve power and become active ("light up") only at times (e.g., periodically or upon detecting an event-such as an uplink signal from a UE).

The present disclosure provides various techniques that may be beneficial in such deployments. One desirable feature of such a deployment is for a UE to be able to identify, within a given cell, a particular node. Therefore, even dormant nodes may need to transmit low duty cycle signals in downlink for a UE to detect. The UE may then send measurement reports, for example, allowing a macro eNB to select an ideal node to serve the UE based on the reported measurements.

Tertiary synchronization signals (TSSs)

According to aspects of the present disclosure, a node may transmit tertiary synchronization signals (TSS) that uniquely identifies the node within a cluster, wherein the cluster itself is identified by a primary synchronization signal (PSS) and secondary synchronization signal (SSS).

Similarly, it may be beneficial for the various nodes to detect a UE. Therefore, UEs may transmit uplink signals allowing this detection (e.g., low duty cycle signals). Reception/detection of these signals may be transmitted to a macro to help make decisions on which node should serve the UE. Further, nodes may be triggered, based on the detection to begin transmitting their own reference signals (e.g., TSS, CRS, CSI-RS, etc.).

Aspects of the present disclosure provide techniques that may allow for a separation for radio resource management (RRM) and radio link management (RLM) from other functionalities.

In some cases, techniques for a cluster-based solution for RRM are provided. In some cases PSS/SSS/CRS may provide cluster information for RRM, while a different reference signal (referred to herein as a tertiary synchronization signal or TSS) and/or CSI-RS may provide more detailed information for densely deployed nodes (e.g., RRH/UE relay). In this manner, PSS/SSS/TSS may be utilized for RRM and RLM, which may allow CSI-RS to be used only for CSI and interference management.

FIG. 6 illustrates an example system with two clusters (labeled Cluster 1 and Cluster 2), in which TSS may be utilized.

As illustrated, in Cluster 1, a macro cell eNB may transmit a PSS1/SSS1/CRS1 unique to the cluster, while other type nodes transmit TSS unique to the transmitting node (e.g. TSS1, TSS2, with two nodes involved in CoMP transmitting the same TSS2). As shown, some nodes may transmit PSS/SSS/CRS/TSS, while other nodes may transmit only TSS.

By linking TSS to PSS/SSS (e.g., with a scrambling code based on PSS/SSS), a UE may still be able to derive the cluster ID from TSS alone. As shown in Cluster 2, the macro eNB may transmit PSS2/SSS2/CSR2, with different type nodes each transmitting a unique TSS (TSS1, TSS2, and TSS3).

The relatively dense deployment of nodes within a cluster may impose further requirements on cell IDs (e.g., on the order of 4000). In some cases, it may be desirable to uniquely identify a cell by some other type identifier, such as a CGI (close group indicator), as some UE relays can be dormant state, it may be desirable for those relays to wake up only when needed for relaying purposes.

According to certain aspects, the usage of TSS may allow for additional cell identification. As will be described herein, such a TSS may be transmitted with relatively low density to save energy. In some cases, TSS may be transmitted with a PSS/SSS like sequence structure to be implementation efficient.

Various other features may be desirable for time and frequency resources of TSS. For example, it may be desirable for TSS to be localized to center 6 RBs. TSS may be optimized for synchronized network but still be functional for asynchronous networks. It may also be desirable to limit density of transmissions in an effort to keep pilot pollution low and avoid interfering cells. Low density of the TSS can allow reuse and effectively reduce interference. It may also be desirable to provide efficient DRX support.

Aspects of the present disclosure may provide TSS designs that allow sufficient time domain reuse. For example, time reuse of TSS may allow relatively easy identification of 8-10 cells (by a UE) without interference cancelation (IC). PSS/SSS/TSS may work for both synchronous and asynchronous systems. In some cases, TSS may be transmitted the same 0/5 subframe locations with PSS/SSS and can be low density (e.g., such as 40 ms periodicity or even larger).

Certain coordinated multipoint (CoMP) scenarios may depend on CRS and CRS interference cancellation for RLM, RRM, and tracking loops. In such cases, CSI-RS is typically used only for CSI and possible interference.

For unsynchronized network control and timing (NCT), it may be desirable to reduced density in time (agreed to have 5 ms density), reduce density in frequency TBC, and/or maintain PSS/SSS sequences but change timing. For synchronized NCT, PSS/SSS sequence may not be changed, but time/frequency locations may or may not be changed.

Current UE Relay Considerations may include Network centric solutions or UE centric solutions. For Network-centric solutions, an eNB may identify which UE (or UEs) may benefit from relay operations and the eNB may send a PDCCH order for RACH with specific sequence. The relay UE may detect RACH and turn on upon reception of strong RACH or report RACH detection/measurement to a macro cell to coordinate what relays should turn on. For UE-centric solutions, a UE may transmit specific UL signal such as SRS. UE relays that detect SRS can either light up upon reception of strong SRS or report to Macro cell to coordinate who to turn on.

For relatively dense (or Hyper Dense) networks with a macro eNB and other type nodes (RRH and/or UE relay nodes), various enhancements are proposed herein. For example, a clustered deployment may be used for RRM, in which each Macro cell along with RRH or relays forms a cluster. RRM among clusters may be handled based on PSS/SSS/CRS. Cell identification as well as association to RRH or UE relay is based on a two layered approach. For example, a cluster may be associated with PSS/SSS, while individual nodes transmit a TSS that uniquely identifies that node.

As an example, a Macro cell may transmit PSS/SSS/CRS with periodicity of 5 ms. This allows a UE to identify cluster as well as perform RRM among clusters (and may be compliant to the Rel 11 NCT decision). Each RRH or relay node may further transmit unique signal for its identification, generally referred to herein as a TSS (Tertiary Synchronization Signal).

TSS may be linked to each cluster (e.g., as a function of PSS/SSS). Combining PSS/SSS/TSS, a UE can uniquely identify the individual cells in a hyper dense cluster. In some cases, the use of PSS/SSS/TSS may be backwards compatible. While UEs of a first capability (so called "legacy UEs" compliant with an earlier version of a standard) may stop at PSS/SSS, UEs of a second capability ("non-legacy UEs") may use TSS. TSS may be used for NCT or legacy carrier as well for CoMP operations.

In some cases, a new RACH format may help with Autonomous Cell Association. For hyper dense deployment, there may be no need to have long RACH sequences due to much smaller cell radius. There may, however, be a need to identify a UE's capability early so that a different procedure can be applied to legacy UEs relative to non-legacy UEs (e.g., UEs that support CoMP and/or hyper dense deployment).

Support of a new RACH format may be broadcasted in one of the SIB or MIB from each cluster, e.g. Macro cell. The configuration of RACH format may be further linked to the unique ID of the RRH or relay node. A UE may use a new RACH format with the specific configuration for Msg 1. Upon detection of Msg 1 with the specific configuration, the RRH or UE relay knows immediately which cell the UE is trying to RACH into and can respond with Msg 2 and so on without network intervention. This is autonomous mode of RRH/relay node identification and UE association.

In some cases CSI-RS use for cell association may be limited because CSI-RS is originally introduced for CSI measurements. It was not designed to handle many other new functions such as RLM, path loss for OL PC, and others. Therefore, an enhanced signal may help separate the functionality of RLM and OLPC from CSI. In this case, CSI-RS may be used only for CSI and interference measurements.

As described above, a Clustered RRM Approach may utilize Cell Association Based on TSS. For RRH, TSS may be transmitted to allow further cell association for new UEs. Upon detection of PSS/SSS/CRS, UE finds the right cluster for RRM as well as tracking loop. For data connections, a new UE may further detect the TSS and RACH configuration. Upon detecting strong TSS, a UE may directly RACH into the closest TSS. This approach may provide relatively exact UL power control to the intended cell and may also reduce the congestion for the Macro cell to handle all the UEs.

UE relays that are in dormant/energy saving mode may not need to transmit TSS, only UE relays that intend to serve users can transmit low duty cycle TSS. UE relays in active transmission mode further transmit CSI-RS for CSI and DM-RS based data transmissions. In some cases relays may need to signal loading information by TSS, e.g. by indicating whether additional users are allowed.

In some cases, the TSS design provided herein may provide various functionality, such as Cell identification, RSRP measurement for cell search, and/or PL measurement for OL PC. TSS time/frequency location may be localized in frequency (e.g. center 6 RB). TSS may also be transmitted in subframes 0/5 in order to allow efficient cell search and power saving.

Regarding TSS density, for RSRP/PL measurement, it can be transmitted at lower duty cycle than PSS/SSS, e.g. every 40 ms. It may also be an event triggered transmission, i.e. relay node will only transmit TSS when it is required to transmit (e.g., upon detecting a UE based on SRS transmissions). Frequency domain density may be similar to that of PSS/SSS (e.g. on the order of 72 tones).

In some cases, TSS time reuse may be designed to avoid/reduce pilot pollution and additional cell identification. For the center 6 RB, subframes 0 and 5, there are total of 14*2=28 symbols. Excluding PSS/SSS/PBCH, there are 20 symbols. So in each radio frame, there are 20 choices for the location of TSS. This symbol location may provide relatively large reuse factor for interference reduction for the detection of TSS. The symbol location can be further tied to the PSS/SSS to convey unique ID for the relay node, e.g. the 8× required cell ID identification.

Figure 7:
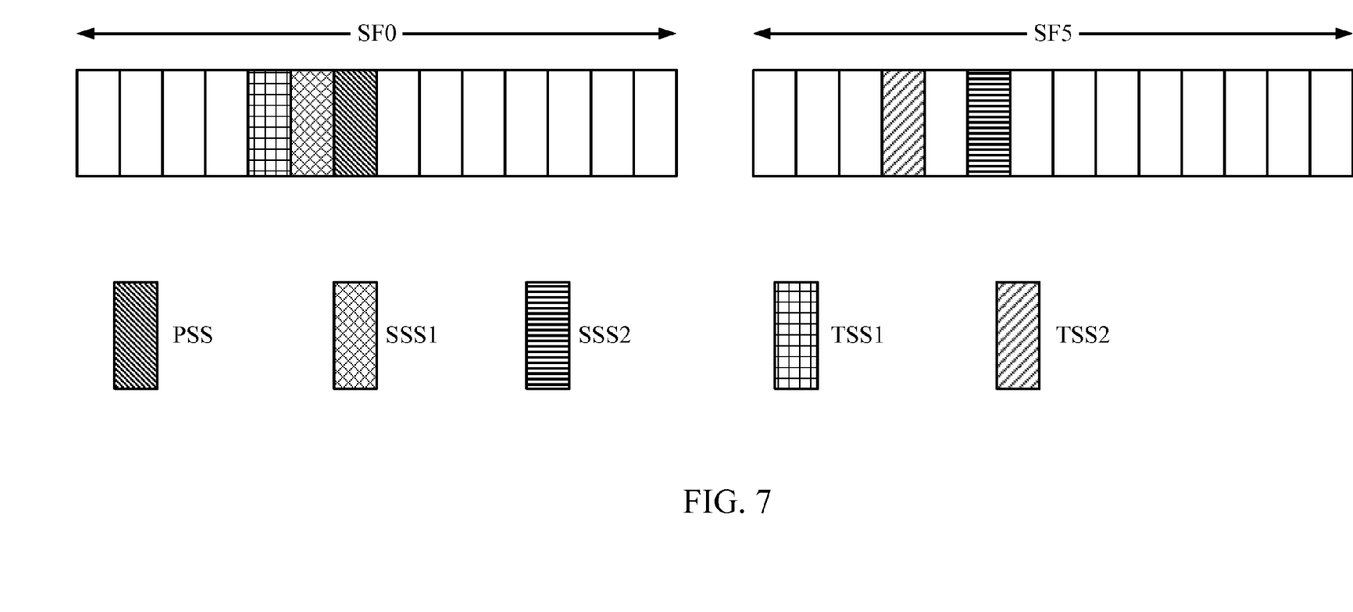
FIG. 7 illustrates an example subframe structure with tertiary synchronization signals (TSSs), according aspects of the present disclosure.

Various options are available for TSS Allocation. FIG. 7 illustrates an example frame structure according to one example TSS allocation.

For example, as illustrated in FIG. 7, TSS may be transmitted on one of the symbols in subframe 0 or 5 that is not used by PSS/SSS/PBCH. This may give the same density as PSS/SSS. As another example, for NCT, CRS may only be used for tracking loop, so antenna ports 2 and 3 are never used. Thus, TSS can be transmitted on the tones defined on antenna ports 2 and 3. This may maximally reuse the structure of current Rel 8. This may give 48 tones, less than PSS/SSS density, but sufficient to convey large number of cell IDs together with PSS/SSS. It may typically be desirable to avoid collision on any CRS symbols to avoid interference.

As shown in FIG. 7, TSS for different nodes may be transmitted in different locations. In some cases, the same sequence may be transmitted, with the particular location of resources used to transmit indicating the particular node.

Figure 8:
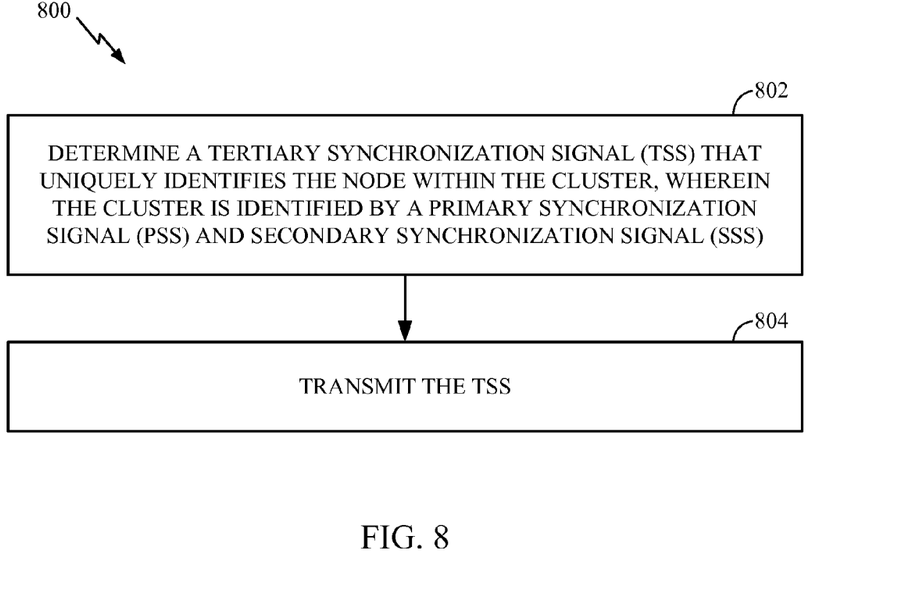
FIG. 8 illustrates example operations that may be performed by a wireless node, according to aspects of the present disclosure.

FIG. 8 illustrates example operations 800 that may be performed by a wireless node utilizing TSS, such as that shown in FIG. 7. For example, the wireless node may be a node belonging to a cluster of cells having a macro node and one or more other type nodes.

The operations 800 may begin, at 802, by determining a tertiary synchronization signal (TSS) that uniquely identifies the node within the cluster, wherein the cluster is identified by a primary synchronization signal (PSS) and secondary synchronization signal (SSS). At 804, the node may transmit the TSS.

Figure 9:
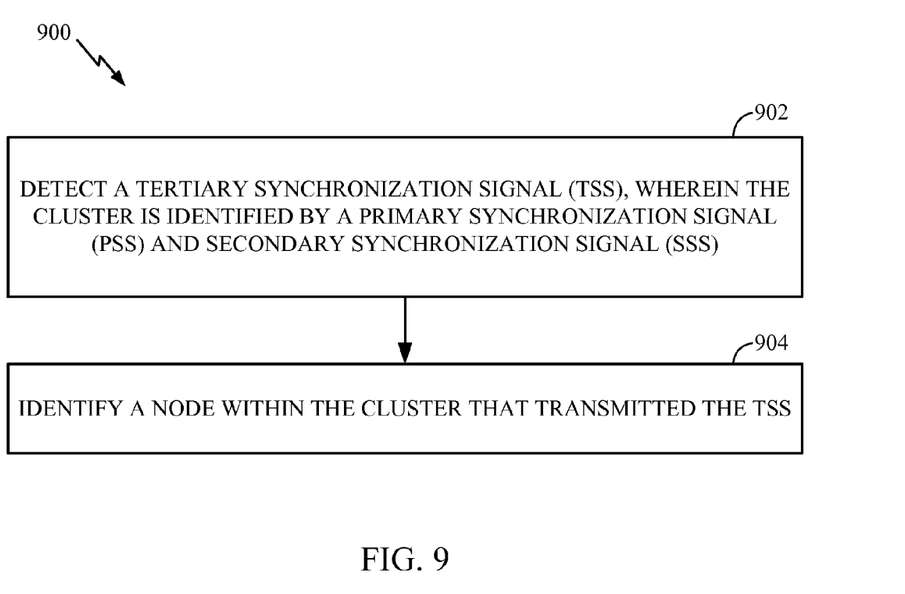
FIG. 9 illustrates example operations that may be performed by a user equipment (UE), according to aspects of the present disclosure.

FIG. 9 illustrates example operations 900 that may be performed by a wireless node to detect TSS. In other words, the operations 900 may be considered complementary to those shown in FIG. 8 and may be performed, for example, by a user equipment (UE) within a cluster of cells having a macro node and one or more other type nodes.

The operations 900 begin, at 902, by detecting a tertiary synchronization signal (TSS), wherein the cluster is identified by a primary synchronization signal (PSS) and secondary synchronization signal (SSS). At 904, the UE identifies a node within the cluster that transmitted the TSS.

Regarding TSS sequence design, TSS can use Chu sequence or binary sequence similar to PSS/SSS. In some cases, different shifts or binary sequences can be used to provide further identification. SSS with different scrambling code may also be used to provide further identification (and the scrambling code may be a function of PSS/SSS or cell ID or global cell ID).

Regarding Density for RSRP measurements, current density for CSI-RS is 6 tones per 40 ms if UE wakes up every 40 ms within 200 ms window. Current density of CRS is 48 tones per antenna per 40 ms if UE measures one SF every 40 ms. The density of 72 or 48 tones per 40 ms from TSS is significantly higher than CSI-RS, and comparable to CRS, therefore can produce accurate RSRP measurements for OL PC and RLM.

TSS may be transmitted in some or all cells including Macro, RRH and UE relay, but at different rates. For example, for RRH, periodic transmission may make sense (as power may not be as big an issue as with UE relays). The time domain periodicity can be configurable depending on the need, e.g. to satisfy the RLM requirement. For UE relay, it should be transmitted only on an as-needed basis. If UE relay is serving any UE, it should transmit TSS periodically to maintain RLM. For UE relays that do not have any UE served, it may have other options, for example, to transmit TSS at a much reduced periodicity and/or transmit TSS only if some UL signal is received from the UE Other options for the DL cell identification that may be considered are also available. For example, CSI-RS based with increased antenna port and density (the increased density of CSI-RS can be viewed as a special form of TSS). Position RS based, "SIB-lite" transmission with more detailed information similar to system information block (SIB), or any form of a "beacon" signal with focused power on certain tones, are also options.

Example Random Access Channel (RACH) Procedure for Densely Deployed Networks

In some cases, a special RACH format may be used for UEs that are capable of communication with other type nodes such as RRHs and relay UEs. For example, a special RACH format may be used to indicate such capability of the UE. Network response may be different depending on the UE capability, for example, conveyed by Msg 1. Relay/CoMP capable UE may be handled by relay/RRH, while other UEs may be handled by the Macro.

In some cases, a similar format as current RACH may be used, but in Msg 3 capability information of UE may be revealed. UE's RACH procedure may be handled by Macro, then setup RRH/Relay connection.

Figure 10:
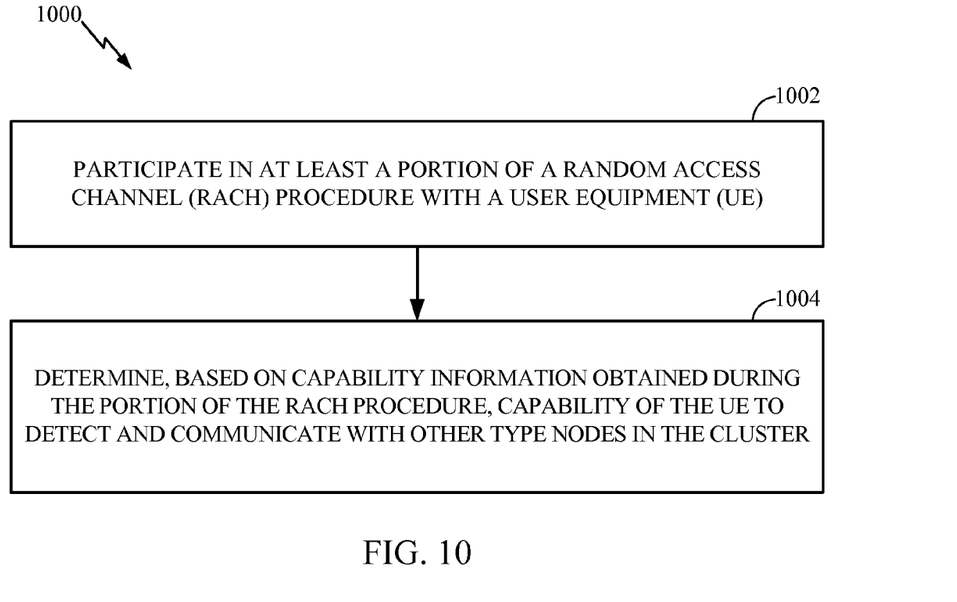
FIG. 10 illustrates example operations of a random access channel (RACH) procedure that may be performed by a wireless node, according to aspects of the present disclosure.

FIG. 10 illustrates example operations 1000 that may be performed by a wireless node utilizing a new RACH procedure. For example, the wireless node may be a node belonging to a cluster of cells having a macro node and one or more other type nodes.

The operations 1000 may begin, at 1002, by participating in at least a portion of a random access channel (RACH) procedure with a user equipment (UE). At 1004, the wireless node determines, based on capability information obtained during the portion of the RACH procedure, capability of the UE to detect and communicate with other type nodes in the cluster.

Figure 11:
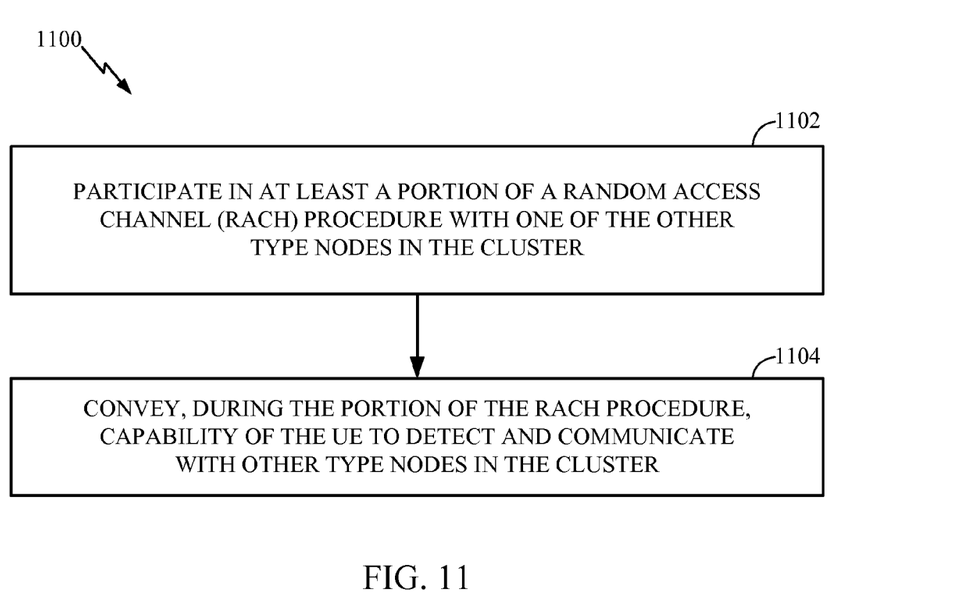
FIG. 11 illustrates example operations of a RACH procedure that may be performed by a user equipment (UE), according to aspects of the present disclosure.

FIG. 11 illustrates example operations 1100 that may be performed by a wireless node to detect TSS. In other words, the operations 1100 may be considered complementary to those shown in FIG. 10 and may be performed, for example, by a user equipment (UE) within a cluster of cells having a macro node and one or more other type nodes.

The operations 1100 begin, at 1102, by participating in at least a portion of a random access channel (RACH) procedure with one of the other type nodes in the cluster. At 1104, the UE conveys, during the portion of the RACH procedure, capability of the UE to detect and communicate with other type nodes in the cluster.

In some cases, there may be a change to the time line for RACH procedure for Messages to allow backhaul communication between UE relay and Macro. For example, a UE may send Msg 1 to be received by all relay nodes. The relay nodes may convey detection as well as signal strength to Macro, and Macro decides on which relay to serve. If Msg 2 is responded from relay, it may have some delay.

For a new RACH format, there are various design options, for example, including shortened format based on the low density requirement and the format may have a narrower bandwidth than 6 RBs.

The various operations of methods described above may be performed by any suitable combination of hardware and/or software component(s) and/or module(s).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications by a node belonging to a cluster of cells having a macro node and one or more other type nodes, comprising:
    transmitting a tertiary synchronization signal (TSS) that uniquely identifies the node within the cluster, wherein the cluster is identified by a primary synchronization signal (PSS) and secondary synchronization signal (SSS), wherein the TSS is linked to the PSS and SSS, such that a user equipment (UE) may determine the PSS and SSS from the TSS.

2. The method of claim 1, further comprising transmitting the PSS and SSS.

3. The method of claim 1, wherein:
    the PSS and SSS allow a first type of UE with a first capability to identify the cluster; and
    the PSS, SSS, and TSS allow a second type of UE to identify the cluster and uniquely identify the node.

4. The method of claim 1, wherein the TSS is generated with a scrambling code that is a function of PSS and SSS.

5. The method of claim 1, wherein different nodes in the cluster transmit respective TSSs at different periodicity.

6. The method of claim 1, wherein TSS is transmitted less often than PSS and SSS.

7. The method of claim 1, wherein transmitting TSS is conditioned upon detecting an event.

8. The method of claim 7, wherein the event comprises detecting a signal transmitted from a user equipment (UE).

9. The method of claim 1, wherein different nodes transmit their respective TSS using at least one of different time resources or different frequency resources.

10. The method of claim 1, wherein a particular node is uniquely identified by at least one of:
    location of frequency and/or time resources used to transmit the TSS;
    a particular sequence used;
    a shift of a common sequence available to other nodes;
    a scrambling code used in generating the TSS;
    which antenna ports are used to transmit the TSS; or
    density of antenna ports used to transmit TSS.

11. A method for wireless communications by a user equipment (UE) within a cluster of cells having a macro node and one or more other type nodes, comprising:
    detecting a tertiary synchronization signal (TSS), wherein the cluster is identified by a primary synchronization signal (PSS) and secondary synchronization signal (SSS);
    determining the PSS and SSS from the TSS; and
    identifying a node within the cluster that transmitted the TSS.

12. The method of claim 11, further comprising:
    receiving the PSS and SSS; and
    identifying the cluster based on the PSS and SSS.

13. The method of claim 11, wherein:
    the PSS and SSS allow a first type of UE with a first capability to identify the cluster; and
    the PSS, SSS, and TSS allow a second type of UE to identify the cluster and uniquely identify the node.

14. The method of claim 11, wherein the TSS is generated with a scrambling code that is a function of PSS and SSS.

15. The method of claim 11, wherein different nodes in the cluster transmit respective TSSs at different periodicity.

16. The method of claim 11, wherein TSS is transmitted less often than PSS and SSS.

17. The method of claim 11, wherein different nodes transmit their respective TSS using at least one of different time resources or different frequency resources.

18. The method of claim 11, wherein the UE uniquely identifies the node by at least one of:
    location of frequency and/or time resources used to transmit the TSS;
    a particular sequence used;
    a shift of a common sequence available to other nodes;
    a scrambling code used in generating the TSS;
    which antenna ports are used to transmit the TSS; or
    density of antenna ports used to transmit TSS.

19. The method of claim 11, further comprising performing at least one of:
    reference signal receive power (RSRP) measurement based on the TSS; or
    path loss (PL) measurement based on the TSS.

20. An apparatus for wireless communications by a node belonging to a cluster of cells having a macro node and one or more other type nodes, comprising:
    means for transmitting a tertiary synchronization signal (TSS) that uniquely identifies the node within the cluster, wherein the cluster is identified by a primary synchronization signal (PSS) and secondary synchronization signal (SSS), wherein the TSS is linked to the PSS and SSS, such that a user equipment (UE) may determine the PSS and SSS from the TSS.

21. An apparatus for wireless communications by a user equipment (UE) within a cluster of cells having a macro node and one or more other type nodes, comprising:
    means for detecting a tertiary synchronization signal (TSS), wherein the cluster is identified by a primary synchronization signal (PSS) and secondary synchronization signal (SSS);
    means for determining the PSS and SSS from the TSS; and
    means for identifying a node within the cluster that transmitted the TSS.

22. An apparatus for wireless communications by a node belonging to a cluster of cells having a macro node and one or more other type nodes, comprising:
    at least one processor configured to transmit a tertiary synchronization signal (TSS) that uniquely identifies the node within the cluster, wherein the cluster is identified by a primary synchronization signal (PSS) and secondary synchronization signal (SSS), wherein the TSS is linked to the PSS and SSS, such that a user equipment (UE) may determine the PSS and SSS from the TSS; and
    a memory coupled with the at least one processor.

23. An apparatus for wireless communications by a user equipment (UE) within a cluster of cells having a macro node and one or more other type nodes, comprising:
    at least one processor configured to:
        detect a tertiary synchronization signal (TSS), wherein the cluster is identified by a primary synchronization signal (PSS) and secondary synchronization signal (SSS) and identify a node within the cluster that transmitted the TSS; and
        determine the PSS and SSS from the TSS; and
    a memory coupled with the at least one processor.

24. A non-transitory computer readable medium having instructions stored thereon for wireless communications by a node belonging to a cluster of cells having a macro node and one or more other type nodes, the computer readable medium having instructions stored thereon for:

transmitting a tertiary synchronization signal (TSS) that uniquely identifies the node within the cluster, wherein the cluster is identified by a primary synchronization signal (PSS) and secondary synchronization signal (SSS), wherein the TSS is linked to the PSS and SSS, such that a user equipment (UE) may determine the PSS and SSS from the TSS.

25. A non-transitory computer readable medium having instructions stored thereon for wireless communications by a user equipment (UE) within a cluster of cells having a macro node and one or more other type nodes, the computer readable medium having instructions stored thereon for:

detecting a tertiary synchronization signal (TSS), wherein the cluster is identified by a primary synchronization signal (PSS) and secondary synchronization signal (SSS);

determining the PSS and SSS from the TSS; and identifying a node within the cluster that transmitted the TSS.

26. The method of claim 1, wherein the TSS comprises a channel-state information reference signal (CSI-RS).

27. The method of claim 11, wherein the TSS comprises a channel-state information reference signal (CSI-RS).

28. The apparatus of claim 20, wherein the TSS comprises a channel-state information reference signal (CSI-RS).

29. The apparatus of claim 21, wherein the TSS comprises a channel-state information reference signal (CSI-RS).

30. The apparatus of claim 22, wherein the TSS comprises a channel-state information reference signal (CSI-RS).

31. The apparatus of claim 23, wherein the TSS comprises a channel-state information reference signal (CSI-RS).

32. The non-transitory computer readable medium of claim 24, wherein the TSS comprises a channel-state information reference signal (CSI-RS).

33. The non-transitory computer readable medium of claim 25, wherein the TSS comprises a channel-state information reference signal (CSI-RS).

* * * * *